Sept. 8, 1931. H. A. SHELKOFSKY 1,822,675
WEEDER
Filed June 7, 1929
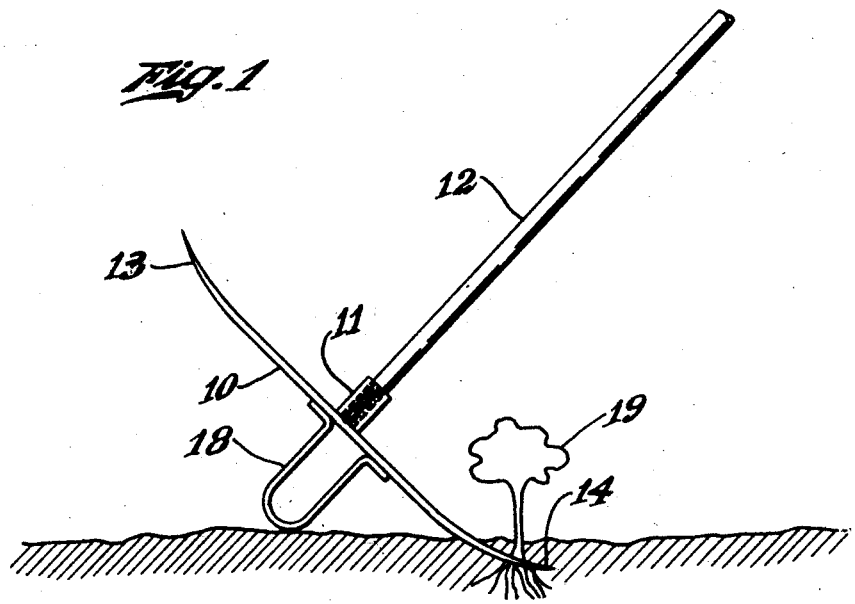
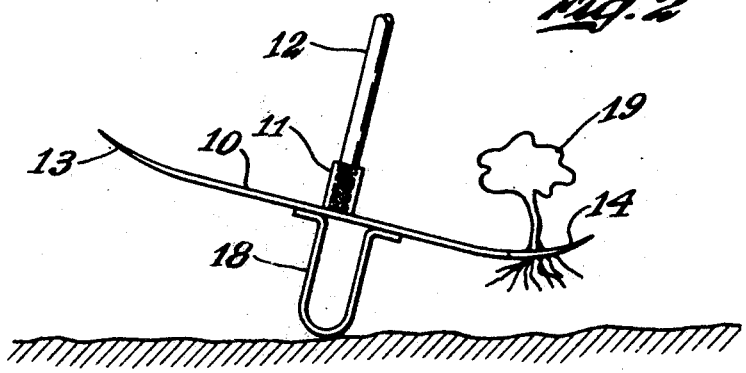
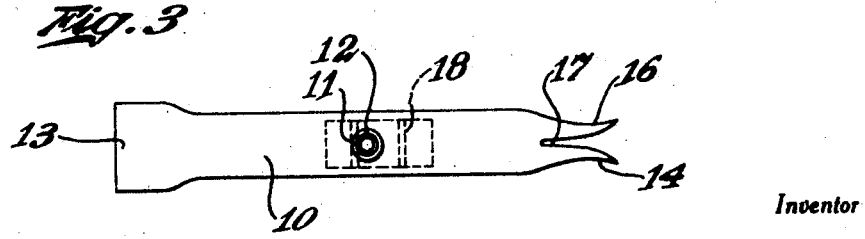
Inventor
H. A. Shelkofsky
By Johnston & Jennings Attorneys Patented Sept. 8, 1931

1,822,675

UNITED STATES PATENT OFFICE

HERMAN A. SHELKOFSKY, OF MONTGOMERY, ALABAMA, ASSIGNOR OF ONE-HALF TO HENRY C. STOWERS, OF MONTGOMERY, ALABAMA

WEEDER

Application filed June 7, 1929. Serial No. 369,165.

My invention relates to that class of tools employed for the pulling of weeds in gardens or lawns and has for its object the provision of a device of the character designated which shall be simple and sturdy of construction and effective to pull weeds or grass with a minimum of defacement of a lawn or garden.

A more particular object of my invention is to provide a combined weeding tool and hoe which shall be effective to rid a lawn of wild grass and weeds without disturbing the even appearance of the lawn.

In ridding lawns, putting greens and other grassy spots of weeds, I have found it very difficult with the tools heretofore known to me, to take the weeds or wild grass up by their roots without making unsightly holes in the ground and marring the even appearance of the planted grass. On the other hand, it is well known that unless many of the wild grasses and weeds are taken up by the roots, that they will come up again in a very short time from the roots left in the ground and the work has to be done all over again.

I have overcome these before mentioned difficulties by providing a tool having a relatively narrow blade with a pair of relatively sharp fingers extending V-shaped from the ends of the blade to provide a narrow crotch in the blade. On the back of the blade is provided a fulcrum member and the blade is so shaped that when sunk in the ground around the roots of a weed or grass it may be caused to exert a substantially vertical pull on the weed or grass to lift it out of the ground with a minimum displacement of earth. Attached to the blade is a substantial handle so arranged as to bring the blade and fulcrum member into their most effective angle of operation.

A device embodying features of my invention is illustrated in the accompanying drawings, forming a part of this application, wherein Fig. 1 is a view in side elevation of the weeder;

Fig. 2 is a view similar to Fig. 1 showing the manner in which the weeder lifts a weed from the ground; and Fig. 3 is an end elevation of the weeder.

Referring to the drawings for a better understanding of my invention, my improved tool comprises a relatively long narrow steel blade 10 having secured to the rear face thereof a threaded socket 11 into which is screwed a pipe section 12 which serves as a handle. The upper end of the blade, as shown in the drawings, is slightly curved and widened at 13 to provide a hoe or mattock.

The lower end of the blade, as shown in the drawing, is curved rearwardly and provided with relatively sharp fingers 14 and 16 flaring outwardly in a V-shape to form a narrow crotch 17. To the rear of the blade is secured, by welding or other suitable means, a U-shaped strap 18 which is adapted to bear against the ground as shown in Fig. 1 and act as a fulcrum for the tool in pulling weeds or grass. As shown in the drawings, the U-shaped member 18 extends rearwardly a sufficient distance so that, as the handle 12 is pushed forwardly until the U-shaped member 18 rests upon the ground and with a weed 19 caught in the crotch 17 of the tool, a substantially vertical lift is given the weed so that it is pulled from the ground with a minimum of defacement of the ground and a minimum of disturbance to surrounding vegetation.

From the foregoing description, the operation and advantages of my improved tool will be readily appreciated. The tool is of relatively heavy construction so that it is easily sunk into the ground with a downward swing toward a weed and the roots of the weed are squeezed together and caught in the crotch 17 between the fingers 14 and 16. The handle 12 is then pushed forward and the fulcrum member 18 engages with the ground so that a substantially vertical lift is exerted on the weed 19. There is thus a minimum of disturbance of the surrounding vegetation, and practically no defacement of the lawn.

While I have shown my invention in but one form, it will be obvious to those skilled in the art that it is not so limited but is susceptible of various changes and modifications, without departing from the spirit thereof, and I desire, therefore, that only such limitations shall be placed thereupon as are imposed by the prior art, or as are specifically set forth in the appended claim.

What I claim is:

A combination hoe and weeding tool comprising a relatively narrow double ended blade member curved rearwardly at each end thereof, one end of said blade being shaped to form a straight edged hoe, a pair of V-shaped fingers extending from the other end of the blade to form a relatively narrow crotch, a U-shaped fulcrum member secured to the front face of the blade intermediate its ends and extending forwardly therefrom, a threaded socket member secured to the rear face of the blade intermediate its ends and extending rearwardly therefrom, and a handle member fitted into the socket.

In testimony whereof I affix my signature.

HERMAN A. SHELKOFSKY.